United States Patent
Frost et al.

(10) Patent No.: US 7,325,669 B2
(45) Date of Patent: Feb. 5, 2008

(54) MEASURING DEVICE FOR CONVEYOR CHAIN

(75) Inventors: Charles C Frost, Ada, MI (US); Jonathan M Rathbun, Comstock Park, MI (US)

(73) Assignee: Frost Links, Inc., Grand Rapids, MI (US)

( * ) Notice: Subject to any disclaimer, the term of this patent is extended or adjusted under 35 U.S.C. 154(b) by 0 days.

(21) Appl. No.: 11/602,790

(22) Filed: Nov. 21, 2006

(65) Prior Publication Data

US 2007/0114110 A1    May 24, 2007

Related U.S. Application Data

(60) Provisional application No. 60/739,588, filed on Nov. 23, 2005.

(51) Int. Cl.
*B65G 47/00* (2006.01)
(52) U.S. Cl. .............. 198/502.3; 73/828; 73/862.391
(58) Field of Classification Search ............ 198/502.3, 198/850, 349.1, 349.95; 73/862.391, 862.392, 73/828
See application file for complete search history.

(56) References Cited

U.S. PATENT DOCUMENTS

| 4,151,652 | A |   | 5/1979  | Palma ................... 33/679.1 |
| 4,413,513 | A |   | 11/1983 | Ross et al. .............. 73/162 |
| 4,566,339 | A | * | 1/1986  | Davidson et al. ....... 73/862.392 |
| 5,186,280 | A |   | 2/1993  | Mattcheck ................ 184/15.3 |
| 5,287,756 | A | * | 2/1994  | Tassic .................. 73/862.391 |
| 5,482,154 | A |   | 1/1996  | Affeldt et al. ......... 198/370.04 |
| 5,490,590 | A |   | 2/1996  | Courtney ................ 198/502.4 |
| 5,492,215 | A |   | 2/1996  | Affeldt et al. .......... 198/464.4 |
| 5,563,392 | A |   | 10/1996 | Brown et al. ............ 235/91 R |
| 5,884,747 | A | * | 3/1999  | Sandstedt et al. ........ 198/502.3 |
| 6,862,939 | B2 |  | 3/2005  | Frost |
| 6,865,955 | B2 | * | 3/2005 | Nassar et al. .............. 73/828 |
| 6,991,094 | B2 |  | 1/2006  | Frost |
| 6,993,978 | B2 |  | 2/2006  | Frost |
| 7,133,742 | B2 | * | 11/2006 | Cruysen et al. .......... 198/502.3 |
| 2005/0061636 | A1 |  | 3/2005 | Frost et al. |

* cited by examiner

*Primary Examiner*—James R. Bidwell
(74) *Attorney, Agent, or Firm*—Vandyke Gardner Linn & Burkhart LLP

(57) ABSTRACT

A conveyor system includes a conveyor line, a conveyor chain movable along the conveyor line, and an electronic device located at a movable component that moves with the chain along the conveyor line. The electronic device may comprise a locating device operable to generate a locating output indicative of a location of the movable component along the conveyor line. Optionally, the electronic device may comprise a sensing device operable to sense a chain characteristic at the component and to generate a sensor output indicative of the chain characteristic. Data collected by the electronic device may be stored at the device and/or transmitted to a controller of the conveyor line. The controller may be operable to determine the chain characteristic at a particular location of the transmitting device in response to the device output.

18 Claims, 1 Drawing Sheet

MEASURING DEVICE FOR CONVEYOR CHAIN

CROSS REFERENCE TO RELATED APPLICATION

The present application claims the benefit of U.S. provisional application Ser. No. 60/739,588, filed Nov. 23, 2005, which is hereby incorporated herein by reference in its entirety.

FIELD OF THE INVENTION

The present invention relates generally to conveying systems and, more particularly, to conveying systems and chains for conveying materials around a conveying path or track of a facility, such as a warehouse or an assembly plant or processing plant or the like.

BACKGROUND OF THE INVENTION

Chains for power transmission or for material handling and processing systems, such as, for example, chains which function to move a plurality of trolleys or the like along a path or conveyor line in a processing plant, warehouse or the like, typically include multiple sections or links joined together by pins or bolts, such as I-pins. Typically, such conveyor lines are installed from a set of plans and facility prints. Over time, the conveyor line may have changes made to it or may be re-positioned within a facility, without the original plans or facility drawings being updated. It thus may be difficult to determine the particular location of the conveyor line in the facility, such as when other changes are being made to the facility plans or when equipment is being added to or moved within the facility.

Also, chain driven conveyor systems can undergo varying levels of strain or chain pull along the length of the conveyor line as the chain travels along the conveyor line. It is known to measure chain pull and strain at the chain links and pins of the chain to determine the strain on the chain. However, existing technology typically cannot correlate the measured data to the specific locations along the conveyor line at which the measured strain occurs. Thus, it may be difficult to determine where exactly along the conveyor line a particular or high strain or chain pull occurs at the chain components.

Therefore, there is a need in the art for a conveyor system that overcomes the short comings of the prior art.

SUMMARY OF THE INVENTION

The present invention provides a conveyor system that may automatically determine and plot a layout of the conveyor line or path while the chain is traveling along the conveyor line. The conveyor system may also automatically determine areas of high temperature and/or high stress/strain/force along the conveyor line, and may correlate the measured characteristics with the corresponding location where such characteristics occur along the conveyor line.

According to an aspect of the present invention, a conveyor system comprises a conveyor line or path, such as an I-beam track for a trolley, a conveyor chain having a plurality of connected components (such as links and pins and the like) and being movable along the conveyor line, a signal generating device (such as a transmitting device or the like) located at a movable component that moves with and/or is part of or is incorporated in the conveyor chain, at least one receiver for receiving an output signal generated by the signal generating device, and a controller operable to determine a location of the signal generating device in response to the receiver or receivers. The controller determines a current location of the signal generating device as the conveyor chain is driven along the conveyor line.

According to another aspect of the present invention, a conveyor system comprises a conveyor line, a conveyor chain having a plurality of connected components and being movable along the conveyor line, a sensing device located at a movable component that moves with the conveyor chain along the conveyor line, a locating device operable to generate a locating output indicative of a location of the movable component along the conveyor line, and a controller. The sensing device is operable to sense a characteristic, such as temperature characteristic or stress/strain characteristic or the like, at or near the movable component and to generate a sensor output indicative of the sensed characteristic. The controller is operable to correlate the sensed characteristic with a particular location of the sensing device at which the sensed characteristic occurs in response to the sensor output and the locating output. The locating device may be at or near the sensing device at the movable component.

Therefore, the present invention provides a conveyor system that may readily track and/or determine the location of a particular chain link or pin or other movable component of the conveyor chain or trolley or conveyor system that moves along the conveyor line or path. The conveyor system of the present invention thus may plot the layout of the conveyor line in response to locational data collected by the conveyor system and/or may determine areas of high temperature and/or high pull force (or other characteristics) at the chain or other movable component as the chain/movable component moves along the conveyor line.

These and other objects, advantages, purposes and features of the present invention will become apparent upon review of the following specification in conjunction with the drawings.

DESCRIPTION OF THE PREFERRED EMBODIMENTS

Figure 1:
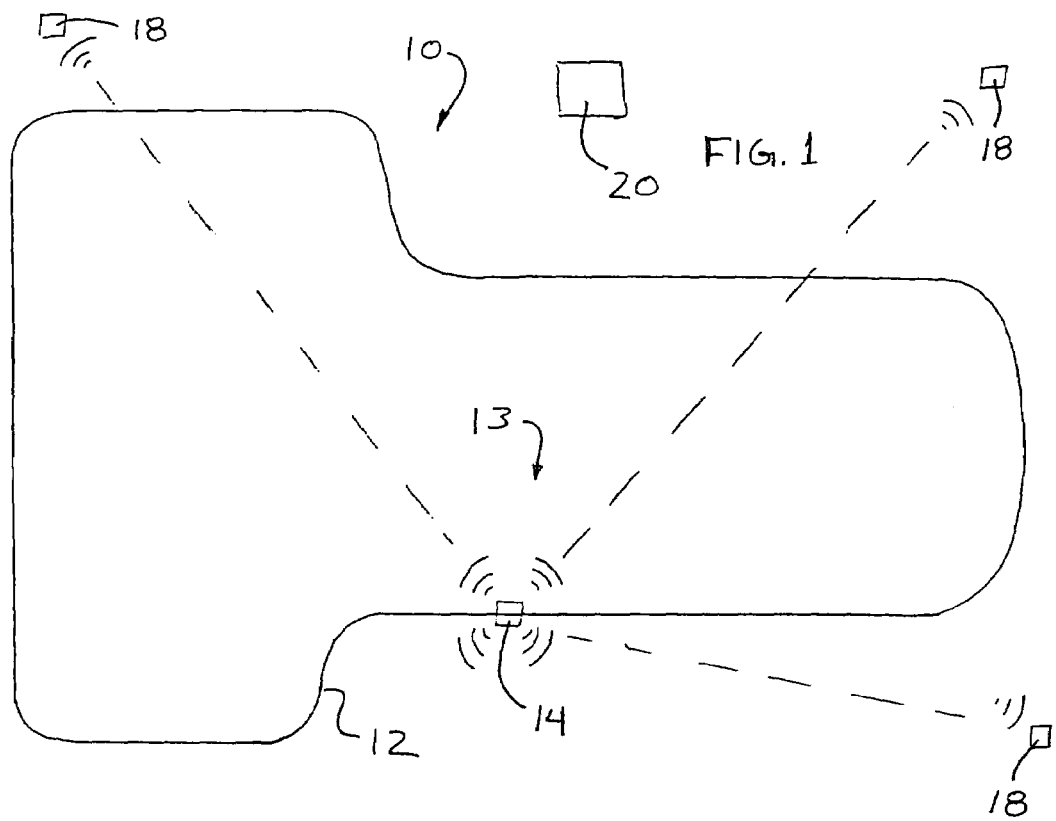
FIG. 1 is a plan view of a conveyor line at a facility and having a conveyor system in accordance with the present invention.
Figure 2:
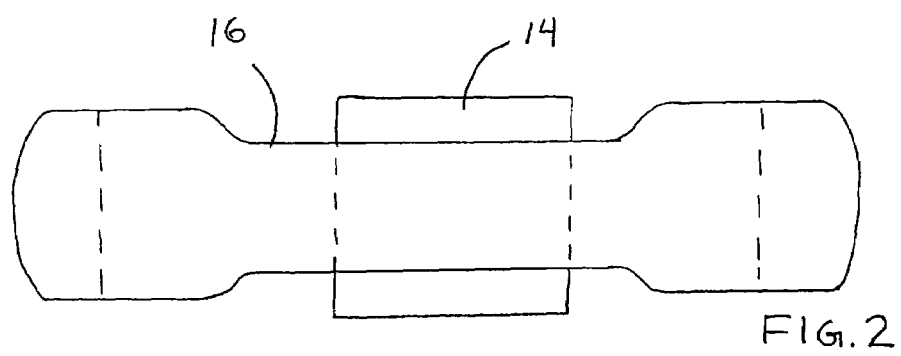
FIG. 2 is a side elevation of a center link of a chain having a transmitting device in accordance with the present invention.

Referring now to the drawings and the illustrative embodiments depicted therein, a conveyor system 10 includes a conveyor line 12 routed along a conveying path at or in a facility, such as a warehouse, assembly plant and/or the like (FIG. 1). The conveyor line includes a continuous loop or path or track set up in a desired route or layout, and along which a plurality of trolleys or the like are conveyed. The trolleys are connected together via a drive chain, such as a chain comprising a plurality of chain links (such as center links and side links) connected together by a plurality of chain pins (such as I-pins or bolted pins or the like). The conveyor system includes a locating device 13, which includes a signal generating device or transmitting device 14 (FIGS. 1 and 2) and one or more receivers or transceivers or signal receiving devices 18. The transmitting device 14 is located at least one of the links 16 or pins (or other chain or trolley component) of the chain and is operable to generate an output signal that is received by the receivers or transceivers 18, whereby the location of the transmitting device (and thus the location of the chain component and the path of the chain) may be determined in response to the output signals of the transmitting device, as discussed below. A controller or base unit 20 may receive an output generated by the receivers or transceivers and may process the output to determine the location of the transmitting device as it travels along the conveyor line.

The conveyor chain includes multiple links or linkages connected together in a continuous loop about a conveying system, as is known in the art. The chain links and pins may comprise any type of chain links or pins, without affecting the scope of the present invention. For example, the chain links or pins may utilize aspects of chains such as the types commercially available in the Frost Smooth link and Frost Sani-link chains, manufactured and marketed by Frost Links, Inc. of Mich., or may be formed utilizing the principles described in U.S. patent application Ser. No. 10/383,825, filed Mar. 7, 2003 by Frost for CONVEYOR CHAIN, now U.S. Pat. No. 6,991,094 (Attorney Docket FR003 P-107); and/or Ser. No. 10/969,825, filed Oct. 21, 2004 by Frost et al. for CONVEYOR CHAIN (Attorney Docket FR003 P-110), which are hereby incorporated herein by reference in their entireties. The chain may be connected to trolleys or the like that are driven around the conveying track (such as an I-beam track or the like) via the chain and a driving device or motor or the like.

As shown in FIG. 1, conveyor system 10 may include three receivers 18 located at different locations at the facility and near or at the conveyor line 12. The receivers 18 wirelessly receive the output signal or signals from the transmitting device 14, and may store the data or may communicate the data or provide a location output signal indicative of the location of the transmitting device relative to the respective receiver to controller 20 for processing, as discussed below. The transmitting device 14 may comprise any type of transmitting device, and may be a battery-operated electronic device capable of wireless transmission/communication. For example, the transmitting device 14 may provide a radio frequency (RF) output or an infrared (IR) output or other wireless communication signal or output, so that the output signal or signals generated by the transmitting device may be readily received by each of the receivers 18 positioned at or near the conveyor line.

The controller 20 may receive an output signal or data from the receivers 18 and may process the data to determine the location of the transmitting device 14 along the conveyor line and relative to the location of the receivers (which may be known locations within the facility). The controller thus may determine and record and plot multiple locations of the transmitting device to plot the conveyor line of the facility to determine the layout of the conveyor line within to the facility. In the illustrated embodiment, the conveyor system includes three receivers and the controller is operable to triangulate the location of the transmitting device in response to the data or signals generated by the receivers over a given time period or cycle. However, more or less receivers may be implemented, without affecting the scope of the present invention. It is envisioned that a single receiver that is operable to determine a relative location of the transmitting device or signal generating device via reception of a signal from the transmitting device (or a return signal from the signal generating device that is in response to a signal from the receiver/transceiver) may be implemented at the conveyor system to determine the location of the transmitting device as it moves along the conveyor line.

Although shown and described as having a transmitter on the chain and one or more receivers disposed at the conveying path, it is envisioned that the measuring device or system may have a receiver or transceiver or reflecting element or device or other type of signal generating device at the movable chain, whereby one or more transmitting devices may be disposed at the conveying path for transmitting a signal and one or more receiving devices disposed at the conveying path may receive a return signal from the movable receiver or transceiver or reflecting element or device at the chain. For example, a sonar device or laser device may be used to generate or transmit a signal from at least one location near the conveyor path, whereby the location of the movable device at the chain is determined in response to a return signal generated by the movable signal generating device (such as via a reflection of a laser beam at a device or element, such as a transceiver or reflecting element) at the movable chain component. Other means for determining the location of a chain component as it is moved along the conveying path may be implemented while remaining within the spirit and scope of the present invention.

The data collected by the receiver or receivers disposed at the conveying path or facility may be downloaded or communicated to the controller in real time, or may be downloaded at appropriate or selected times or locations of the transmitting device, without affecting the scope of the present invention. For example, the receivers may receive the signals from the transmitting device and may store data indicative of the signals, and the data from the multiple receivers may later be downloaded to the controller and processed to determine the location and movement of the transmitting device and thus to plot the conveyor line of the conveyor system. Alternately, and optionally, the receivers may comprise transceivers or the like, and may receive the data or signals from the transmitting device and may transmit or otherwise communicate such data/signals to the controller for processing.

The conveyor system of the present invention thus may generate transmissions or signals by the transmitting device as the transmitting device is moved along the conveyor line, and the controller may process data indicative of the signals to determine the layout or path or route of the conveyor line. The conveyor system thus may readily determine or plot or map the current layout of the conveyor line so that facility plans and the like may be readily updated or revised to indicate the current conveyor layout.

Figure 3:
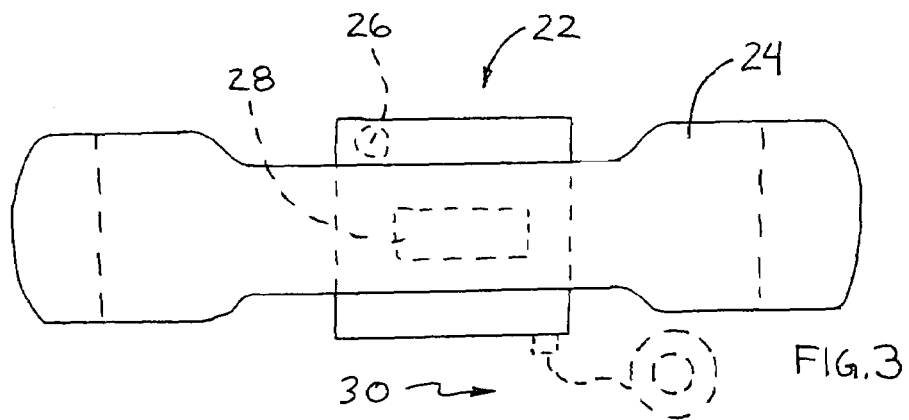
FIG. 3 is a side elevation of a center link of a chain having one or more sensors in accordance with the present invention.

Optionally, and with reference to FIG. 3, a conveyor system in accordance with the present invention may include a sensor unit or sensing device or element 22 at one of the connecting links 24 or pins of the conveyor chain. The sensing device 22 may sense one or more chain characteristics, such as strain or pull force at the chain link or environment characteristics at or near the chain link or the like, and may detect movement of the chain link and sensing device to determine the location of the chain link or sensing device along the conveyor line. For example, and with reference to FIG. 3, sensing device 22 may include a temperature sensor 26 for sensing the temperature at or near the chain link as the chain and sensing device 22 travel along the conveying line. Optionally, the sensing device 22 may include a strain gauge 28 or the like for sensing the strain or pull force at the chain link as the chain travels and turns along the conveying line or path. Optionally, the sensing device 22 may include a locating device or location determining device 30, such as a locating device similar to locating device 13 described above or such as a rotary encoder or the like (such as, for example, a rotary encoder that may determine the rotation and travel of a wheel, such as a wheel that engages a conveyor beam or the like, along which the trolleys are moved as the chain moves along the conveyor line). The locating device and/or system may then be operable to detect or determine the location of the sensing device and chain link and/or to track movement or travel of the sensing device and chain link to determine or approximate a location of the sensing device and chain link along the conveying line.

Sensing device 22 may comprise memory or the like (for storing digital data or other data) and may store data collected from the temperature sensor and/or strain gauge and/or location determining device. The collected and stored data may be downloaded to a controller or base unit or the like or may be wirelessly communicated to a controller or base unit or the like (such as via a radio frequency transmission or the like). The collected data may be correlated and may be processed to determine the temperature and strain at the connecting link at any given location along the conveying line. Optionally, and desirably, the sensing device may include a transmitter or transmitting device, and may transmit or communicate the data and/or signal to the controller so that the controller may receive temperature and/or strain data as the chain travels along the conveying line. The controller may consist of a device capable of reading and storing the transmitted RF data from the sensing device, and may have a TCP/IP addressable functionality that allows for integration into existing Ethernet networks or the like. Optionally, the data or information may be available to or provided to the controller or base unit in real time, such as over an existing computer network, such as via a TCP/IP Ethernet link or the like. The conveyor system thus may measure and map out the strain or chain pull along a conveyor line to determine areas of high strain.

The sensor unit or sensing device may comprise a battery powered unit and may include or house the strain gauge or force transducer, temperature sensor, rotary encoder, and a microcontroller with data acquisition and storage capability, and may have wireless transmitting (such as RF) capability. In the illustrated embodiment, the sensor unit is attached to a center link 16' that becomes part of the conveyor chain and moves with the conveyor chain along the conveyor line. As the sensor unit travels through the conveyor system, the sensor unit may collect and store positional and chain pull force data. Preferably, the force transducer/strain gauge may sample chain pull forces at a high frequency, and then may average multiple measurements to create an average force reading (such as over a short period of time or short travel distance), while the location determining device or rotary encoder may sample at a reduced rate, such as about four times per second or the like.

The sensor unit may transmit the data to the controller or base unit, such as when the sensing device travels by or near to the base unit or station or controller, such as via an RF link (such as a 315/433 MHz RF data link or the like) to the controller or base unit. For example, the sensor unit may be operable to transmit the data in response to a switch, such as a magnetic switch or the like, that can be activated from outside the sensor unit housing as the sensor unit passes a triggering or actuating device or element, such as a magnet pre-positioned along the conveyor line. The sensor unit thus may transmit its collected data to the controller at a desirable location along the conveyor line, such as at a location where the distance or path between the transmitting device and the controller is reduced or substantially not obstructed or compromised. For example, a magnetic switch of the sensor unit may be opened and closed a predetermined number of times (such as by a magnet or magnets positioned along the conveying line or by an actuating signal generated by the controller or other triggering device) within a given time period to cause the sensor unit to transmit its stored data, and the magnetic switch may be opened and closed a different predetermined number of times within a given time period to cause the sensor unit to erase its stored data and start recording new data.

Other means for causing transmittal and/or downloading of the data may be implemented without affecting the scope of the present invention. For example, the data may be downloaded via a wired connection to a computer or controller base unit or base station or the like when the conveyor line is deactivated. The controller or base unit or base station may process the data or the controller or base unit or station may be accessed via TCP/IP to download the data into a workstation for further processing or analysis.

The sensing device or sensor unit is preferably or desirably designed to withstand the elevated or high temperatures and adverse environmental conditions that the sensing device or sensor unit may encounter as it travels along the conveyor line. For example, the sensing device may include or comprise a sealed, substantially waterproof or water resistant enclosure or casing, with substantially waterproof or water resistant switches (such as on/off switches and the like). The strain gauge or force transducer is preferably able to withstand extreme forces, such as a force of about 32,000 lbs along any axis. The temperature sensor preferably can withstand temperatures in the range of about −20 degrees Fahrenheit to about 600 degrees Fahrenheit, and preferably can measure temperatures from about 20 degrees Fahrenheit to about 500 degrees Fahrenheit. However, clearly other forms of strain gauges or force transducers or temperature sensors may be utilized while remaining within the spirit and scope of the present invention.

Optionally, the sensor unit or sensing device may have one or more indicators or lights, such as light emitting diodes (LEDs) or the like, that are operable or energizable to indicate a status of the sensing device during operation of the sensing device. For example, the sensing device may have a red LED that is energized when the sensing unit is activated, a green LED that is energized when the sensing device is transmitting its stored data, and a yellow or amber LED that is energized to display the status of the unit. For example, the amber LED may flash once every two seconds to indicate that the sensing device memory or buffer is full and is no longer collecting data, and/or may flash twice per second to indicate a detected hardware problem or other status information. Clearly, other flash rates or sequences or other indicating means may be implemented to indicate the status of the sensing device, without affecting the scope of the present invention.

Although shown as being attached to or part of a center link of a conveyor chain, clearly the transmitting device and/or sensing device of the present invention may be at a side link or at a pin of the movable chain, or at a trolley or other movable component of the conveyor (which moves with the chain along the conveyor line), without affecting the scope of the present invention. The transmitting device and/or sensing device thus may be located at any movable component of the conveyor that moves along the conveyor line or path, so that the controller or base unit may determine and plot the location of the device and associated component to plot the layout of the conveyor line and/or to determine areas of high temperature or high strain or the like along the conveyor line. The information or data collected or sensed by the sensors may be stored at the sensing device or unit and/or may be downloaded to a controller or communicated to a controller for extracting the desired information from the collected data. The component (such as a pin or center link or side link or trolley component) at which the sensing device/transmitting device is located may be configured to be installed/inserted into an existing conveyor line or chain, so that the route/layout and/or characteristics of the existing conveyor line may be determined without substantial changes to the conveyor line or chain.

Therefore, the present invention provides a conveyor system that may readily track and/or determine the location of a particular chain link or pin or other movable component of the conveyor chain or trolley or conveyor system that moves along the conveyor line or path. The conveyor system includes an electronic signal generating device that may transmit or otherwise generate or communicate a signal to one or more receivers so that a controller may process outputs of the receiver/receivers to determine a location of the device as it travels along the conveyor line. Optionally, the electronic signal generating device (or another electronic device at one or more of the chain components) may include a sensor, such as a temperature sensor or a force transducer, for sensing a temperature characteristic or force characteristic or other characteristic at the component, whereby data collected by the sensor may be stored at the device and/or transmitted to a controller of the conveyor system. The conveyor system of the present invention thus may plot the layout of the conveyor line in response to locational data collected by the conveyor system and/or may determine areas of high temperature and/or high pull force (or other characteristics) at the chain along the conveyor line.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A conveyor system comprising:
   a conveyor line;
   a conveyor chain movable along said conveyor line;
   a signal generating device located at a movable component that is movable with said conveyor chain along said conveyor line, said signal generating device generating an output signal;
   at least one receiver for receiving said output signal generated by said signal generating device; and
   a controller operable to determine a location of said signal generating device in response to said at least one receiver, said controller determining a current location of said signal generating device as said conveyor chain is driven along said conveyor line, said controller determining the location of said signal generating device at multiple locations along said conveyor line as said signal generating device moves along said conveyor line.

2. The conveyor system of claim 1 further comprising at least one sensor for sensing a chain characteristic at the movable component of the conveyor chain, said controller being operable to correlate the sensed characteristic with the location of said signal generating device along said conveyor line.

3. The conveyor system of claim 2, wherein said signal generating device further comprises said at least one sensor.

4. The conveyor system of claim 1, wherein said signal generating device includes a strain gauge that measures the strain at said movable component, said controller being operable to determine the strain at said movable component at a location along said conveyor line in response to said strain gauge and said output signal of said signal generating device.

5. The conveyor system of claim 1, wherein said signal generating device includes a temperature sensor that measures the temperature at said movable component, said controller being operable to determine the temperature at said movable component at a location along said conveyor line in response to said temperature sensor and said output signal from said signal generating device.

6. The conveyor system of claim 1, wherein said output signal of said signal generating device comprises a wireless output signal.

7. The conveyor system of claim 1, wherein said movable component comprises at least one of a chain link of said conveyor chain, a chain pin of said conveyor chain and a trolley component attached to and movable with said conveyor chain.

8. A conveyor system comprising:
   a conveyor line;
   a conveyor chain movable along said conveyor line;
   a signal generating device located at a movable component that is movable with said conveyor chain along said conveyor line, said signal generating device generating an output signal;
   at least one receiver for receiving said output signal generated by said signal generating device; and
   a controller operable to determine a location of said signal generating device in response to said at least one receiver, said controller determining a current location of said signal generating device as said conveyor chain is driven along said conveyor line, wherein said at least one receiver comprises at least three receivers, said controller being operable to triangulate the location of said signal generating device in response to said at least three receivers.

9. A conveyor system comprising:
   a conveyor line;
   a conveyor chain movable along said conveyor line;
   a signal generating device located at a movable component that is movable with said conveyor chain along said conveyor line, said signal generating device generating an output signal;
   at least one receiver for receiving said output signal generated by said signal generating device; and
   a controller operable to determine a location of said signal generating device in response to said at least one receiver, said controller determining a current location of said signal generating device as said conveyor chain is driven along said conveyor line, wherein said controller is operable to plot the location of said signal generating device at multiple locations along said conveyor line to determine the layout of said conveyor line in response to said output signal generated by said signal generating device as said signal generating device moves along said conveyor line.

10. A conveyor system comprising:

a conveyor line;

a conveyor chain movable along said conveyor line;

a sensing device located at a movable component that is movable with said chain along said conveyor line, said sensing device operable to sense a characteristic at said movable component and to generate a sensor output indicative of the sensed characteristic at multiple locations along said conveyor line;

a locating device at or near said sensing device and operable to generate a locating output indicative of multiple locations of said movable component along said conveyor line; and a controller operable to correlate the sensed characteristic with respective locations of said sensing device in response to said sensor output and said locating output and as said movable component moves along said conveyor line.

11. The conveyor system of claim 10, wherein said sensing device comprises a temperature sensor operable to sense a temperature characteristic at said movable component.

12. The conveyor system of claim 10, wherein said sensing device comprises a strain gauge operable to sense a strain characteristic at said movable component.

13. The conveyor system of claim 10, wherein said locating device comprises a rotary encoder operable to determine the travel of said movable component and said conveyor chain along said conveyor line.

14. The conveyor system of claim 10 further comprising a signal generating device at said movable component and at least one receiver located at said facility and operable to receive an output signal generated by said signal generating device, said controller determining the location of said movable component in response to said at least one receiver.

15. The conveyor system of claim 14, wherein said locating device further comprises said signal generating device.

16. The conveyor system of claim 14, wherein said output signal generated by said signal generating device comprises an output signal that is communicated wirelessly to said receiver.

17. The conveyor system of claim 10, wherein said movable component comprises at least one of a chain link of said conveyor chain, a chain pin of said conveyor chain and a trolley component attached to and movable with said conveyor chain.

18. A conveyor system comprising:

a conveyor line;

a conveyor chain movable along said conveyor line;

a sensing device located at a movable component that is movable with said chain along said conveyor line, said sensing device operable to sense a characteristic at said movable component and to generate a sensor output indicative of the sensed characteristic;

a locating device at or near said sensing device and operable to generate a locating output indicative of a location of said movable component along said conveyor line;

a controller operable to correlate the sensed characteristic with a particular location of said sensing device in response to said sensor output and said locating output; and a signal generating device at said movable component and at least one receiver located at said facility and operable to receive an output signal generated by said signal generating device, said controller determining the location of said movable component in response to said at least one receiver, wherein said at least one receiver comprises at least three receivers, said controller being operable to determine the location of said signal generating device in response to the outputs of said at least three receivers.

* * * * *